United States Patent
Ishii et al.

(10) Patent No.: US 9,234,747 B2
(45) Date of Patent: Jan. 12, 2016

(54) APPARATUS WHICH ESTIMATES INSIDE OF OBJECT AND METHOD OF ESTIMATING INSIDE OF OBJECT

(71) Applicant: Panasonic Corporation, Osaka (JP)

(72) Inventors: Yasunori Ishii, Osaka (JP); Toshiya Arai, Osaka (JP); Yasuhiro Mukaigawa, Osaka (JP); Yasushi Yagi, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 163 days.

(21) Appl. No.: 13/959,842

(22) Filed: Aug. 6, 2013

(65) Prior Publication Data

US 2014/0043620 A1 Feb. 13, 2014

(30) Foreign Application Priority Data

Aug. 13, 2012 (JP) .................................. 2012-179159

(51) Int. Cl.
*G01J 3/00* (2006.01)
*G01B 11/24* (2006.01)

(52) U.S. Cl.
CPC ...................... *G01B 11/24* (2013.01)

(58) Field of Classification Search
None
See application file for complete search history.

(56) References Cited

U.S. PATENT DOCUMENTS

| | | | |
|---|---|---|---|
| 5,070,455 A | * | 12/1991 | Singer et al. .................. 378/6 |
| 5,581,659 A | * | 12/1996 | Takatori .......................... 706/19 |
| 5,678,556 A | | 10/1997 | Maki et al. |

FOREIGN PATENT DOCUMENTS

| | | |
|---|---|---|
| JP | 08-029329 | 2/1996 |
| JP | 08-042829 | 2/1996 |
| JP | 2000-105191 | 4/2000 |
| JP | 2002-333400 | 11/2002 |

OTHER PUBLICATIONS

Hashimoto et al., "Fundamentals of Image Reconstruction in C Programming Language", Dec. 2006, p. 245.
Wang et al., "MCML-Monte Carlo modeling of light transport in multi-layerd tissues", Computer Methods and Programs in Biomedicines 47 (1995) pp. 131-146.

(Continued)

*Primary Examiner* — Tri T Ton
(74) *Attorney, Agent, or Firm* — Wenderoth, Lind & Ponack, L.L.P.

(57) ABSTRACT

An apparatus which estimates an inside of an object, includes: a first obtaining unit which obtains light path models and a first light intensity distribution, based on an assumption that a first object includes no second object, distribution; a second obtaining unit which obtains a second light intensity distribution which is an intensity distribution of observed light; a voting value calculating unit which calculates a voting value for each of positions on a predetermined plane, based on a result of comparison in light intensity between the first and second light intensity distributions; a voting unit which votes the voting value to voting regions on a light path model along which light reaches each position; and an estimating unit which estimates whether the second object exists in each voting region, based on a result of the voting.

10 Claims, 15 Drawing Sheets

(56) References Cited

OTHER PUBLICATIONS

Narasimham et al., "Acquiring Scattering Properties of Participating Media by Dilution", ACM SIGGRAPH, 2006.

Simpson et al., "Near-infrared optical properties of ex vivo human skin and subcutaneous tissues measured using the Monte Carlo inversion technique", Simpson et al.., Phys. Med. Biol.43, 1998, pp. 2465-2478.

* cited by examiner

APPARATUS WHICH ESTIMATES INSIDE OF OBJECT AND METHOD OF ESTIMATING INSIDE OF OBJECT

CROSS REFERENCE TO RELATED APPLICATION

The present application is based on and claims priority of Japanese Patent Application No. 2012-179159 filed on Aug. 13, 2012. The entire disclosure of the above-identified application, including the specification, drawings and claims is incorporated herein by reference in its entirety.

FIELD

One or more exemplary embodiments disclosed herein relate generally to an apparatus which estimates the inside of an object and a method of estimating the inside of the object.

BACKGROUND

A technique for estimating the inside of an object is important. Examples of the application of the technique include detecting a foreign object, such as a needle, contained in food, and estimating the shape of a foreign object, such as a needle, stuck in the skin. High-accuracy estimation of the inside of an object supports an increase in food safety and medical advancement.

As a method of estimating the inside of an object, a method is widely used which is based on X-ray computed tomography. In the method which uses X-ray computed tomography, the following procedure is basically performed. First, X-rays are emitted into an object which contains a foreign object and the amount of the X-rays exiting the object is observed. Subsequently, the distribution of absorptance of light (X-rays) in the object is estimated based on the ratio of the amount of outgoing X-rays to the amount of incident X-rays (that is, based on the amount of absorption of light). In practice, X-rays are directed to an object from 360-degree direction and the amount of attenuation of X-rays exiting the object is observed. Subsequently, the distribution of absorptance of the inside of the object is estimated using a method referred to as a back projection or a filtered back projection.

By emitting light beams from a light source, observing the outgoing amount of the light beams transmitted through the object, and analyzing the observation results in such a manner, it is possible to estimate the positions and the shapes of absorbing objects in the object.

CITATION LIST

Patent Literature

[PTL 1] Japanese Unexamined Patent Application Publication No. 2000-105191
[PTL 2] Japanese Unexamined Patent Application Publication No. 8-29329
[PTL 3] Japanese Unexamined Patent Application Publication No. 2002-333400

Non Patent Literature

[NPL 1] "Fundamentals of Image Reconstruction in C Programming Language", Hashimoto, Shinohara, Iryo Kagakusha, P. 245
[NPL 2] "MCML-Monte Carlo modeling of light transport in multi-layered tissues", Wang et al., Computer Methods and Programs in Biomedicines, 47 (1995), pp. 131 to 146
[NPL 3] "Acquiring Scattering Properties of Participating Media by Dilution", Narasimham et al., ACM SIGGRAPH, 2006
[NPL 4] "Near-infrared optical properties of ex vivo human skin and subcutaneous tissues measured using the Monte Carlo inversion technique", Simpson et al., Phys. Med. Biol. 43, 1998, pp. 2465 to 2478

SUMMARY

However, the method disclosed by NPL 1 requires a large mechanical apparatus for estimating the inside of an object, and a special apparatus for measuring the amount of outgoing beams. Furthermore, in the case where X-rays are used to estimate the inside of a human body, there is a risk of so-called "medical radiation exposure". Hence, use of X-rays for a long period of time or use of X-rays on pregnant women should be avoided.

In recent years, techniques have been developed in which the positions of light absorbing objects inside an object are estimated by using near-infrared light which is light that is safe to the human body. Use of near-infrared light is superior to use of X-rays, in terms of safety and convenience of the apparatus. However, the near-infrared light is scattered within an object; and thus, analysis of the outgoing near-infrared light is more difficult than X-rays.

In view of this, one non-limiting and exemplary embodiment provides an apparatus and a method of estimating the inside of an object. The apparatus and method allow an increase in the accuracy in estimating the inside of the object with use of light that is safe to the human body.

In one general aspect, the techniques disclosed here feature an apparatus which estimates an inside of a first object. The apparatus includes: a first obtaining unit which obtains a plurality of light path models and a first light intensity distribution, based on an assumption that the first object includes no second object which is different from the first object, the light path models representing a plurality of paths taken by light after entering the first object and before exiting the first object, the first light intensity distribution indicating an intensity of virtual light on a predetermined plane, the virtual light exiting the first object after propagating through the first object along the light path models; a second obtaining unit which obtains a second light intensity distribution which is an intensity distribution of light exiting the first object after entering the first object, the intensity distribution of the light being observed on the predetermined plane; a voting value calculating unit which calculates a voting value for each of positions on the predetermined plane, based on a result of comparison in light intensity between the first light intensity distribution and the second light intensity distribution, the voting value indicating a probability of existence of the second object in the first object; a voting unit which virtually divides the inside of the first object into a plurality of voting regions, and to vote the voting value calculated for the each of the positions on the predetermined plane to voting regions on a light path model along which light reaches the position, the voting being performed for the each of the positions; and an estimating unit which estimates whether or not the second object exists in each of the voting regions, based on a result of the voting.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The apparatus which estimates the inside of an object according to one or more exemplary embodiments or features disclosed herein is capable of increasing the accuracy in estimating the inside of the object with use of light that is safe to the human body.

BRIEF DESCRIPTION OF DRAWINGS

These and other objects, advantages and features of the invention will become apparent from the following description thereof taken in conjunction with the accompanying drawings that illustrate a specific embodiment of the present invention.

DETAILED DESCRIPTION OF INVENTION

Underlying Knowledge Forming Basis of the Present Disclosure

In relation to the method of estimating the inside of an object described in the Background section, the inventors have found the following problem. In the following description, an object in which scattering occurs is referred to as a scatterer. Furthermore, an object which absorbs light within the scatterer is referred to as a light absorbing object.

Figure 16:
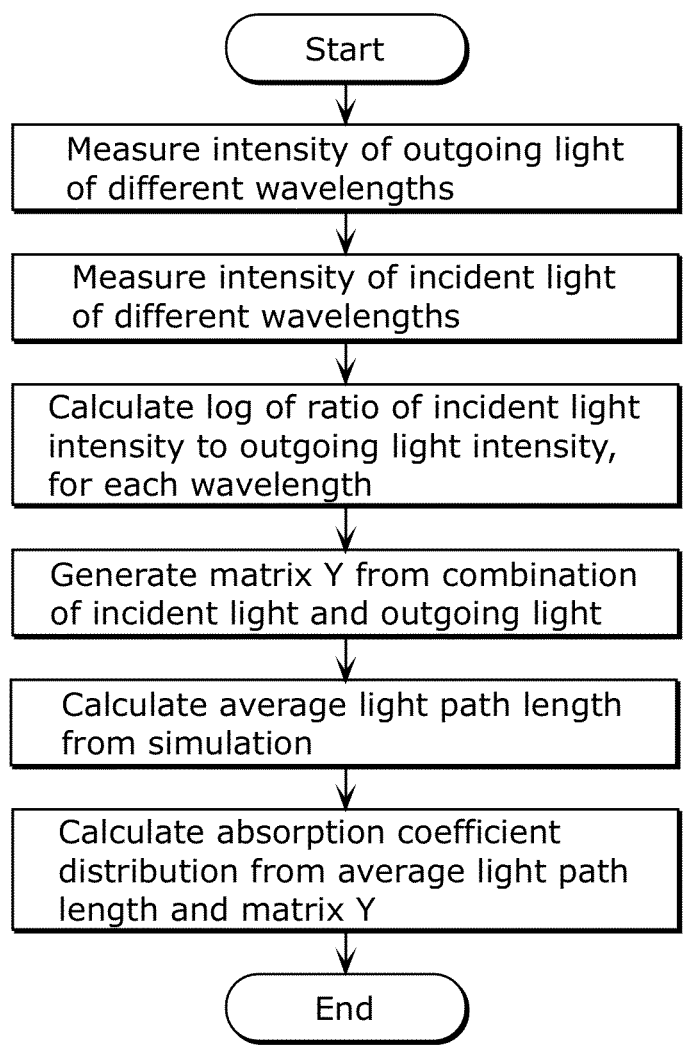
FIG. 16 is a flowchart of a conventional method of estimating a distribution of absorptance of a scatterer.

FIG. 16 is a flowchart of a conventional method of estimating a distribution of absorptance of a scatterer. As shown in FIG. 16, in PTLs 1 to 3, the intensity of incident light of a plurality of wavelengths and the intensity of outgoing light of a plurality of wavelengths are measured, and a matrix Y is generated based on a combination of the measured intensities of the incident light and the outgoing light. Subsequently, the scatterer is divided into a plurality of spaces (hereinafter, referred to as voxels), and light paths are simulated by Monte Carlo ray tracing. An average light path length is obtained from the light paths (light path models) shown in the simulation results. Unknowns are reduced by using light of a plurality of wavelengths, and an absorption distribution of the scatterer is obtained from the matrix Y and the average light path length.

However, in such a method, the following two approximations are performed to calculate the absorption distribution of the scatterer using a linear operation. The first approximation is that light attenuation caused by scattering or spread of scattering is equal among a plurality of wavelengths. The second approximation is that the average light path length is equal between different wavelengths. In practice, scattering and absorption coefficient distribution have wavelength dependency; and thus, the average light path length is actually different for each wavelength. Due to such approximations, it is difficult to obtain the accurate absorptance distribution of the scatterer by the conventional method.

In view of this, the apparatus which estimates the inside of an object according to an exemplary embodiment disclosed herein is an apparatus which estimates an inside of a first object. The apparatus includes: a first obtaining unit which obtains a plurality of light path models and a first light intensity distribution, based on an assumption that the first object includes no second object which is different from the first object, the light path models representing a plurality of paths taken by light after entering the first object and before exiting the first object, the first light intensity distribution indicating an intensity of virtual light on a predetermined plane, the virtual light exiting the first object after propagating through the first object along the light path models; a second obtaining unit which obtains a second light intensity distribution which is an intensity distribution of light exiting the first object after entering the first object, the intensity distribution of the light being observed on the predetermined plane; a voting value calculating unit which calculates a voting value for each of positions on the predetermined plane, based on a result of comparison in light intensity between the first light intensity distribution and the second light intensity distribution, the voting value indicating a probability of existence of the second object in the first object; a voting unit which virtually divides the inside of the first object into a plurality of voting regions, and to vote the voting value calculated for the each of the positions on the predetermined plane to voting regions on a light path model along which light reaches the position, the voting being performed for the each of the positions; and an estimating unit which estimates whether or not the second object exists in each of the voting regions, based on a result of the voting.

With the configuration, it is possible to estimate whether or not the second object exists in each region in the first object, by using a plurality of light path models representing a plurality of paths taken by light after entering the first object and before exiting the first object. Accordingly, even in the case where light is scattered within the first object, it is possible to estimate the position and the shape of the second object within the first object. More specifically, it is possible to increase the accuracy in estimating the inside of an object with use of light which is other than X-rays, such as near-infrared light, and which is safe to the human body.

Furthermore, with the configuration, it is possible to calculate a voting value indicating the probability of existence of the second object in the first object, based on a result of comparison in light intensity between the first light intensity distribution and the second light intensity distribution. Furthermore, it is possible to estimate whether or not the second object exists in each voting region on the optical model, based on the voting result of the voting value relative to the voting region. More specifically, it is not necessary to use light of a plurality of wavelengths nor to perform linear operations, to estimate the inside of the first object. Accordingly, the approximations described above for the linear operation of the absorptance distribution are also unnecessary, which allows an increase in the accuracy in estimating the inside of the object.

Furthermore, for example, it may be that the apparatus further includes: a correcting unit configured to correct the voting result, based on a variation in a total number of times the voting was performed among the voting regions, in which the estimating unit estimates whether or not the second object exists in each of the voting regions, based on the corrected voting result.

With the configuration, it is possible to correct the voting results, based on the variation in the number of times voting was performed on the voting regions. Accordingly, for example, it is possible to reduce erroneous estimation that the second object exists in regions, in the first object, where light is less likely to pass (regions with less number of times voting was performed).

For example, it may also be that the voting regions are a plurality of regions on a cross-section of the first object, the estimating unit generates a plurality of two-dimensional tomographic images by estimating, for each of a plurality of the cross-sections, whether or not the second object exists in each of the voting regions, and the apparatus further includes a combining unit which generates three-dimensional volume data of the inside of the first object, by combining the two-dimensional tomographic images.

With the configuration, it is possible to generate three-dimensional volume data by combining two-dimensional tomographic images. Accordingly, it is possible to estimate the inside of the first object more accurately.

For example, it may also be that the second obtaining unit includes: a light source unit which emits visible light or near-infrared light to the first object; and a capturing unit which obtains an observation image indicating the second light intensity distribution, by capturing an image of light exiting the first object after entering the first object.

With the configuration, the second obtaining unit is capable of obtaining an observation image indicating the second light intensity distribution, by using the light source unit and the capturing unit.

For example, it may also be that the first obtaining unit derives the light path models by Monte Carlo ray tracing simulation.

With the configuration, it is possible to relatively easily derive light path models by the Monte Carlo ray tracing simulation.

For example, it may also be that the first obtaining unit derives a parameter to be used in the Monte Carlo ray tracing simulation, by reducing an error between a simulation result and an observation result through a coarse-to-fine search.

With the configuration, it is possible to derive parameters to be used in the Monte Carlo ray tracing simulation by Coarse-to-Fine Search, which allows an increase in the parameter accuracy.

For example, it may also be that the first obtaining unit obtains the light path models and the first light intensity distribution for each of a plurality of light beams which enters the first object from different directions, the second obtaining unit obtains the second light intensity distribution for each of the light beams, the voting value calculating unit calculates the voting value for each of the light beams, and the voting unit votes the voting value for each of the light beams.

With the configuration, it is possible to obtain voting results for respective light beams which enter the first object from a plurality of directions. Hence, it is possible to increase the estimate accuracy in the depth direction compared to cases where a light beam which enters the first object from one direction is used.

Furthermore, for example, it may be that the apparatus further includes a correcting unit which corrects the voting result, based on the position of each of the voting regions, in which the estimating unit estimates, based on the corrected voting result, whether or not the second object exists in each of the voting regions.

With the configuration, it is possible to correct the voting results based on the positions of the respective voting regions. Accordingly, it is possible to suppress a decrease in the estimate accuracy in the case where the accuracy in estimating whether or not the second object exists varies depending on the position of the voting region.

For example, it may also be that the voting regions include a first voting region and a second voting region that is closer to a center of the first object than the first voting region is, and the correcting unit corrects the voting result to allow the probability of existence of the second object in the first voting region to be relatively lower than the probability of existence of the second object in the second voting region.

With the configuration, it is possible to correct the voting result to allow the probability of existence of the second object in the first voting region to be relatively lower than the probability of existence of the second object in the second voting region. Here, the second voting region is closer to the center of the first object than the first voting region is. Accordingly, among the voting regions on the light path models of light transmitting through the second object, it is possible to decrease the erroneous estimation that the second object exists in the voting regions where the second object does not actually exist.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

An apparatus which estimates the inside of an object (hereinafter, referred to as the estimation apparatus) according to Embodiment 1 estimates the inside of an object. In particular, in Embodiment 1, the estimation apparatus estimates the positions and the shapes of one or more light absorbing objects included in a scatterer.

Here, the scatterer refers to an object in which scattering occurs. The light absorbing object refers to any objects which absorb light regardless of light absorptance or the like. The scatterer may be in any form of solid, liquid, and gas. For example, in the case where the scatterer is liquid water, the estimation apparatus is capable of estimating an absorbing object in water. Furthermore, for example, in the case where the scatterer is a mixture of gaseous air and liquid water droplets, the estimation apparatus is capable of estimating the inside of fog. Here, the scatterer is an example of a first object. The light absorbing object is an example of a second object.

<Functional Configuration>

Figure 1:
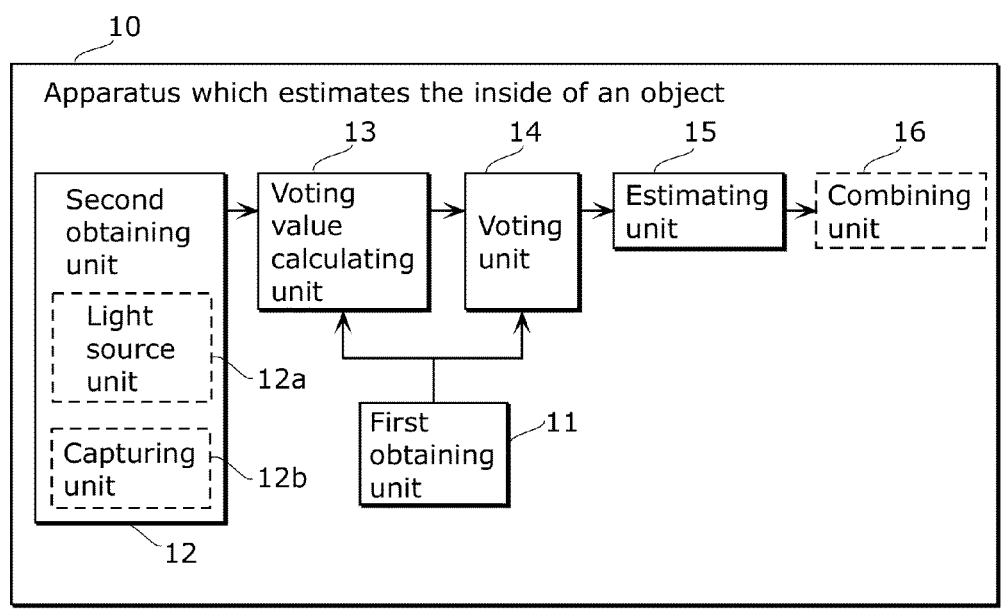
FIG. 1 is a block diagram showing a functional configuration of an apparatus which estimates the inside of an object, according to Embodiment 1.

FIG. 1 is a block diagram showing a functional configuration of an apparatus 10 which estimates the inside of an object (hereinafter, referred to as the estimation apparatus 10), according to Embodiment 1. As shown in FIG. 1, the estimation apparatus 10 includes a first obtaining unit 11, a second obtaining unit 12, a voting value calculating unit 13, a voting unit 14, an estimating unit 15, and a combining unit 16. The estimation apparatus 10 may not include the combining unit 16. For example, the combining unit 16 may be included in an apparatus outside the estimation apparatus 10.

(First Obtaining Unit 11)

The first obtaining unit 11 obtains a plurality of light path models and a first light intensity distribution, based on an assumption that the scatterer includes no light absorbing object. The light path models represent a plurality of paths taken by light after entering a scatterer and before exiting the scatterer. The first light intensity distribution indicates intensity of virtual light, on a predetermined plane, exiting the scatterer after propagating through the scatterer along the light path models. The predetermined plane refers to a flat or curved surface outside the scatterer, and a plane which light beams exiting the scatterer reach. More specifically, the first obtaining unit 11 obtains virtual light paths in the scatterer, and a virtual light intensity distribution outside the scatterer.

In Embodiment 1, the first obtaining unit 11 obtains, as a light path model, a set of divided regions (for example, voxels) in the scatterer through which light pass, with use of scattering simulation models (hereinafter, simply referred to as scattering models). The first obtaining unit 11 also obtains transmittance of light which has propagated through the scatterer along each light path model. Light transmittance refers to the ratio of the intensity of outgoing light to the intensity of incident light. In other words, transmittance of a plurality of light beams corresponds to the first light intensity distribution.

(Second Obtaining Unit 12)

The second obtaining unit 12 obtains a second light intensity distribution which is the intensity distribution of light, observed on a predetermined plane, exiting the scatterer after entering the scatterer. As described above, the predetermined plane refers to a plane which light, exiting the scatterer after entering the scatterer, reaches. For example, the predetermined plane is a plane perpendicular to the incident direction of light on the scatterer.

In Embodiment 1, the second obtaining unit 12 obtains an observation image which indicates the second intensity distribution, by capturing an image of light which has transmitted through the scatterer (scattered light and light moving in a straight line). More specifically, the second obtaining unit 12 includes: a light source unit 12a which emits visible light or near-infrared light to the scatterer; and a capturing unit 12b which obtains an observation image indicating the second intensity distribution, by capturing an image of light exiting the scatterer after entering the scatterer.

For example, the light source unit 12a is a laser which outputs visible light beams or near-infrared light beams. Furthermore, for example, the capturing unit 12b is a camera which includes a lens unit, an imaging device, and others.

(Voting Value Calculating Unit 13)

The voting value calculating unit 13 calculates, for each position on the predetermined plane on which the second light intensity distribution is observed, a voting value based on a result of comparison in light intensity between the first light intensity distribution and the second light intensity distribution. The voting value indicates a probability of existence of a light absorbing object in a scatterer. In other words, the voting value indicates a probability of non-existence of the light absorbing object in the scatterer. More specifically, the voting value indicates probabilities of existence and non-existence of the light absorbing object on a path of light reaching each position on the predetermined plane.

In the following description, the probability, which has a higher value when a light absorbing object is more likely to exist, is referred to as the "existence probability". In contrast, the probability, which has a higher value when a light absorbing object is less likely to exist, is referred to as the "non-existence probability".

The voting value calculating unit 13 may calculate, as a voting value indicating the non-existence probability, a value proportional to a result obtained by dividing one of light intensity values in the second light intensity distribution (hereinafter, referred to as a second intensity value) by a corresponding light intensity value in the first light intensity distribution (hereinafter, referred to as a first intensity value), for example. Furthermore, for example, the voting value calculating unit 13 may calculate, as a voting value indicating the existence probability, a value proportional to a difference value between the first intensity value and the second intensity value. Furthermore, for example, the voting value calculating unit 13 may calculate, as a voting value indicating the existence probability, a value proportional to a result obtained by dividing the difference value between the first intensity value and the second intensity value by the first intensity value.

In Embodiment 1, the voting value calculating unit 13 obtains, as a probability of non-existence of a light absorbing object on a path of light reaching each pixel (non-existence probability), the proportion of each pixel value (observation value) in an observation image captured by the capturing unit 12b to the light transmittance corresponding to the pixel.

The light transmittance obtained by scattering models is obtained under an assumption that no light absorbing object exists within a scatterer. Hence, when the light transmittance in a given pixel is equal to the observation value, it is estimated that no light absorbing object exists on the path taken by light reaching the pixel. In contrast, the smaller the observation value at a given pixel is than the light transmittance, it is estimated that the probability of existence of a light absorbing object on the path taken by light reaching the pixel is higher.

(Voting Unit 14)

The voting unit 14 virtually divides the inside of a scatterer into a plurality of voting regions. Subsequently, the voting unit 14 votes, for each position on a predetermined plane on which the second light intensity distribution is observed, the voting value calculated for the position to voting regions on the light path model along which light reaches the position. More specifically, the voting unit 14 adds the voting value calculated for each position to the value of each voting region on the path model of light reaching the position, for example.

In Embodiment 1, the voting unit 14 votes, to the voting regions on the light path model corresponding to each pixel, the voting value which is calculated by the voting value calculating unit 13 and which indicates the non-existence probability of a light absorbing object at the pixel.

(Estimating Unit 15)

The estimating unit 15 estimates the position of the light absorbing object in the scatterer, based on the values of the voting results. In other words, the estimating unit 15 estimates whether or not the light absorbing object exists in each of the voting regions, based on the voting results. More specifically, the estimating unit 15 compares the value of each voting region (voting result) with a threshold, for example. Subsequently, the estimating unit 15 estimates whether or not the light absorbing object exists in the voting region, based on the comparison result.

In Embodiment 1, the voting regions are a plurality of regions on a cross-section of the scatterer. The estimating unit 15 then generates two-dimensional tomographic images by estimating, for each cross-section, whether or not the light absorbing object exists in each voting region.

(Combining Unit 16)

The combining unit 16 generates three-dimensional volume data of the inside of the scatterer, by combining the two-dimensional tomographic images.

<Operations>

Next, a description is given of operations of the estimation apparatus 10 having the configuration as above.

Figure 2:
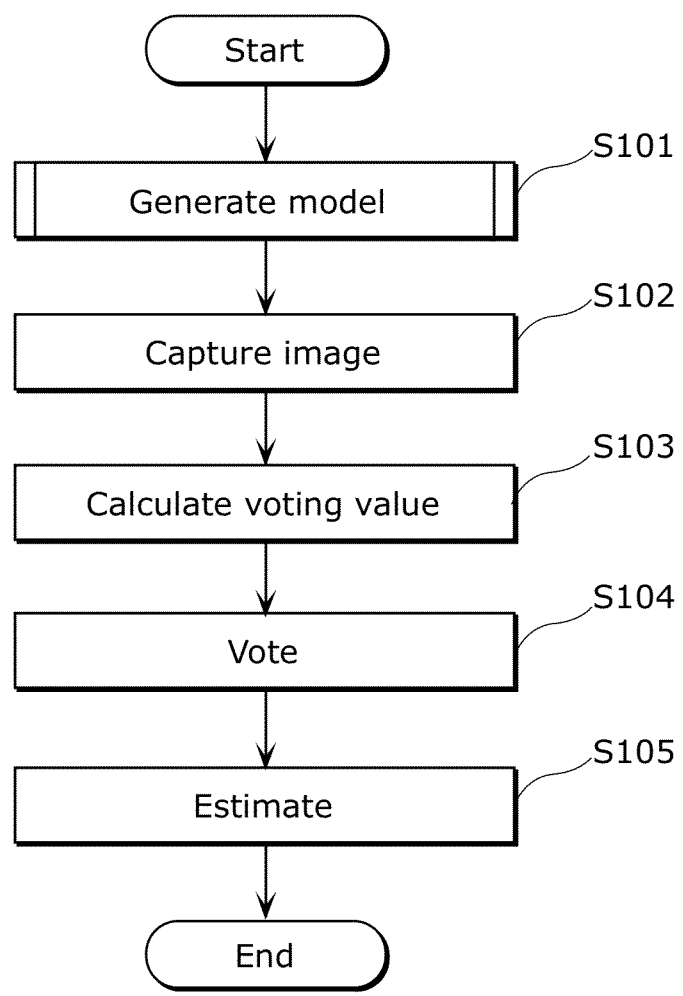
FIG. 2 is a flowchart of operations performed by the apparatus which estimates the inside of the object, according to Embodiment 1.

FIG. 2 is a flowchart of operations of the estimation apparatus 10 according to Embodiment 1.

(Step S101)

First, a description is given of model generation (S101) performed by the first obtaining unit 11. In the model generation, the first obtaining unit 11 calculates a plurality of light path models and light transmittance. As a method of modeling scattering, Monte Carlo ray tracing is used in Embodiment 1. More specifically, the first obtaining unit 11 derives the light path models by the Monte Carlo ray tracing simulation.

The Monte Carlo ray tracing is used, in the field of computer graphics, as a method of modeling complicated light beam paths which involve scattering, refraction and the like. For example, NPL 2 discloses the details of specific methods of modeling light paths using the Monte Carlo ray tracing.

Figure 3:
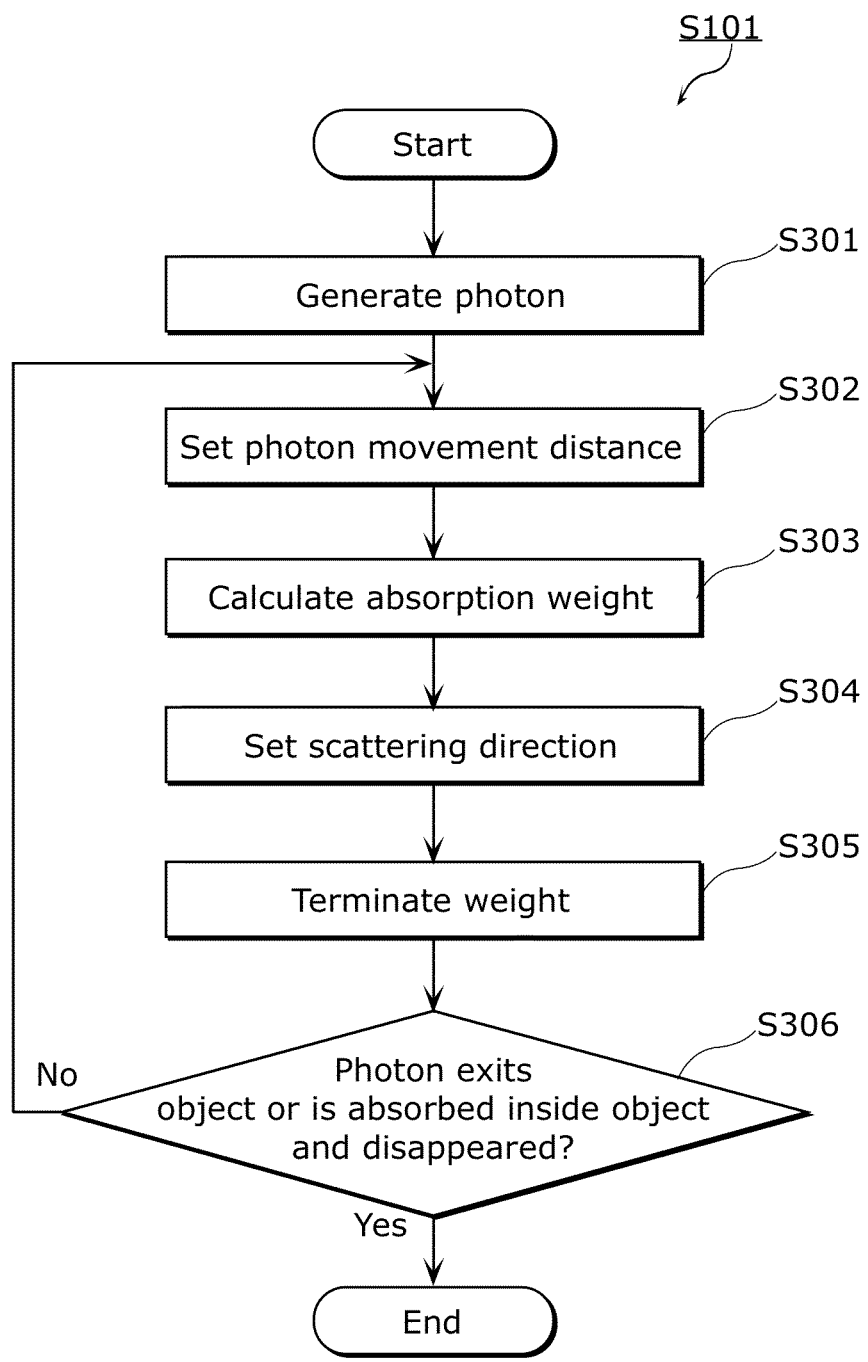
FIG. 3 is a flowchart of the details of processing for deriving a light path model, according to Embodiment 1.

FIG. 3 is a flowchart of the details of processing for deriving a light path model by the Monte Carlo ray tracing simulation. The first obtaining unit 11 simulates a light path model according to the flowchart. The first obtaining unit 11 calculates light transmittance according to a scattering model to be described later.

A light path is formed by photon movement. Here, a description is given of a method of simulating photon movement in a three-dimensional space (x, y, z). A light path is obtained which is taken by a photon, on a given two-dimensional cross-section (x, y), moving from the point of z=0 to the periphery of the scatterer while being scattered.

(Step S301)

In photon generation (S301), the initial position and the initial movement direction of a photon is set. For example, the initial position of the photon is set to (x, y, z)=(0, 0, 0), and the vector relative to the movement direction is set to ($\mu x$, $\mu y$, $\mu z$)=(0, 0, 1).

(Step S302)

In setting of photon movement distance (S302), the step size of photon movement is obtained. The step size s is calculated as shown in Equation (1) according to the Beer-Lambert law.

[Equation 1]

$$s = -\frac{\ln \xi}{\mu_t} \quad (1)$$

Here, $\mu_t$ represents an extinction coefficient which is a sum of the scattering coefficient $\mu_s$ and the absorption coefficient $\mu_a$. The step size s of photon movement is defined by using the extinction coefficient at the current photon position and a random number $\xi$ ($0 < \xi \leq 1$). When the step size s is determined, the position of the photon after the movement is set as shown by Equation (2).

[Equation 2]

$$x \leftarrow x + \mu_x s$$

$$y \leftarrow y + \mu_y s$$

$$z \leftarrow z + \mu_z s \quad (2)$$

(Step S303)

In calculation of absorption weight (S303), the reduction amount $\Delta W$ of weight is obtained from the ratio of the absorption coefficient to the extinction coefficient. The initial value W of weight is appropriately determined according to an object. When the weight is 0, it means that the photon is absorbed inside the object and does not exit the object. Hence, when W increases, a photon is less likely to be absorbed inside the object. When W decreases, the photon is likely to be absorbed inside the object. W is set according to a medium of a target object.

[Equation 3]

$$\Delta W = \frac{\mu_a}{\mu_t} W \quad (3)$$

$$W \leftarrow W - \Delta W$$

(Step S304)

In setting of scattering direction (S304), the photon movement angle $\theta$ is determined as shown in Equation (4), using a phase function parameter g and a random number $\xi$ ($0 < \xi \leq 1$). The phase function refers to a function which approximately represents a bias in scattering. The phase function parameter g represents scattering isotropy. More specifically, if g has a positive value, the scattering is in the forward direction. If g has a value of 0, the scattering is isotropic. If g has a negative value, the scattering is in the backward direction.

[Equation 4]

$$\cos\theta = \begin{cases} \frac{1}{2g}\left[1+g^2-\left(\frac{1-g^2}{1-g+2g\xi}\right)^2\right] & \text{if } g \neq 0 \\ 1-2\xi & \text{if } g = 0 \end{cases} \quad (4)$$

Here, where $\phi=2\pi\xi$, the photon movement direction $\theta$ is represented by Equations (5), (6), and (7).

[Equation 5]

$$\mu'_x = \frac{\sin\theta(\mu_x\mu_z\cos\phi - \mu_y\sin\phi)}{\sqrt{1-\mu_z^2}} + \mu_x\cos\theta \quad (5)$$

[Equation 6]

$$\mu'_y = \frac{\sin\theta(\mu_y\mu_z\cos\phi - u_x\sin\phi)}{\sqrt{1-\mu_z^2}} + \mu_y\cos\theta \quad (6)$$

[Equation 7]

$$\mu'_z = -\sqrt{1-\mu_z^2}\sin\theta\cos\phi + \mu_z\cos\theta \quad (7)$$

It is to be noted that when $\mu_z=1$, Equations (8), (9), and (10) are used, and when $\mu_z=-1$, Equations (11), (12), and (13) are used.

[Equation 8]

$$\mu'_x = \sin\theta\cos\psi \quad (8)$$

[Equation 9]

$$\mu'_y = \sin\theta\cos\theta \quad (9)$$

[Equation 10]

$$\mu'_z = \cos\theta \quad (10)$$

[Equation 11]

$$\mu'_x = \sin\theta\cos\psi \quad (11)$$

[Equation 12]

$$\mu'_y = -\sin\theta\cos\theta \quad (12)$$

[Equation 13]

$$\mu'_z = -\cos\theta \quad (13)$$

(Step S305)

In weight termination (S305), photon termination referred to as a Russian roulette technique is performed. More specifically, using a random number $\xi$ ($0 \leq \xi \leq 1$) and a constant m, as shown in Equation (14), if the random number $\xi$ is smaller than or equal to $1/m$, W is updated to mW, and if the random number $\xi$ is greater than $1/m$, the photon is terminated.

[Equation 14]

$$W = \begin{cases} mW & \xi \leq 1/m \\ 0 & \xi > 1/m \end{cases} \quad (14)$$

(Step S306)

After the above processing, survived photons (photons which have not been terminated) will undergo the setting of photon movement distance. More specifically, the photon movement step size s is obtained by using the updated $\mu'_x$, $\mu'_y$, $\mu'_z$ and the extinction coefficient of the current position. In such a manner, in the Monte Carlo ray tracing simulation, light path models are obtained in which the movement distance and the movement direction are stochastically perturbed by random numbers.

Next, the first obtaining unit 11 obtains light transmittance relative to light path models which are in the scatterer and are obtained by the above processing. Here, a model of a light path leading from an incident point to an outgoing point via scattering points is obtained by the Monte Carlo ray tracing simulation.

Figure 4:
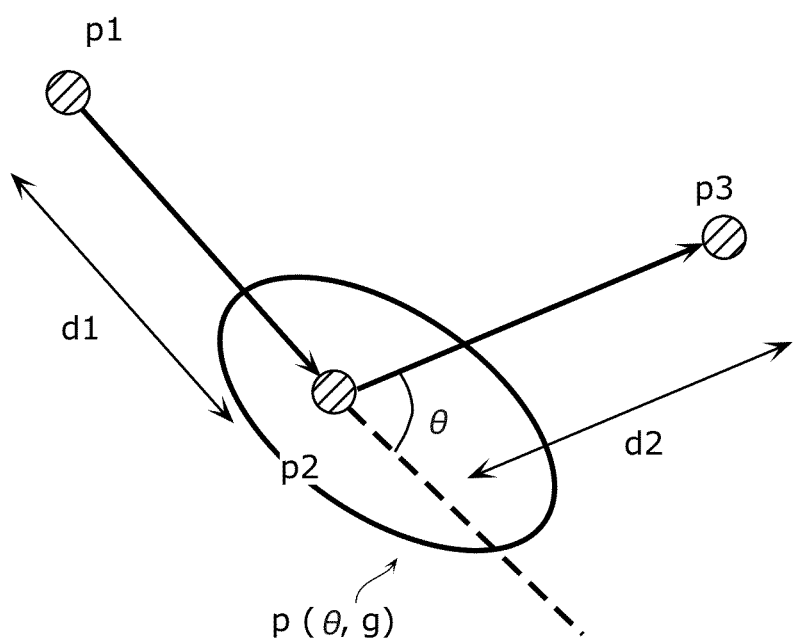
FIG. 4 is a diagram for explaining attenuation of light intensity according to Embodiment 1.

FIG. 4 is a diagram for explaining light intensity attenuation in the case where three points, p1, p2 and p3 in a scatterer are given. In the light path where light from the point p1 is scattered toward the direction of angle $\theta$ at the scattering point p2 that is distant from the point p1 by distance $d_1$, and reaches the point p3 that is distant from the point p2 by distance $d_2$, light propagation ratio $E_{p1,p2,p3}$ is represented by Equation (15).

[Equation 15]

$$E_{p1,p2,p3} = \mu_s p(\theta,g)\exp(-\mu_t(d_1+d_2)) \quad (15)$$

Here, $p(\theta, g)$ is referred to as a phase function which is a function proximately representing a bias in scattering and which is defined by Equation (16).

[Equation 16]

$$p(\theta, g) = \frac{1}{4\pi}\frac{1-g^2}{(1+g^2-2g\cos\theta)^{\frac{3}{2}}} \quad (16)$$

As in the descriptions of the Monte Carlo ray tracing simulation, the parameter g of the phase function represents scattering isotropy. More specifically, if g has a positive value, the scattering is in the forward direction. If g has a value of 0, the scattering is isotropic. If g has a negative value, the scattering is in the backward direction.

Now, a description is given of light transmittance of light path Rj obtained by the Monte Carlo ray tracing simulation. The light path Rj connects scattering points $r_1, r_2, \ldots, r_m$, incident point $r_0$, and outgoing point $r_{m+1}$. When light is scattered at a given scattering point $r_k$ toward the direction of angle $\theta_{k-1,k,k+1}$, light transmittance is represented by a product of Equation (15); and thus, the light transmittance ERj of the light path Rj is defined by Equation (17).

[Equation 17]

$$ERj = \Pi_{k=1}^{m}(\exp(-\mu_t d_{k-1,k})\mu_s p(\theta_{k-1,k,k+1},g))\exp(-\mu_t(d_{m,m+1})) \quad (17)$$

It is to be noted that the distance $d_{k,k+1}$ and the angle $\theta_{k-1,k,k+1}$ are defined by Equation (18).

[Equation 18]

$$d_{k,k+1} = |r_k - r_{k+1}| \quad (18)$$

$$\theta_{k-1,k,k+1} = \cos^{-1}\left(\frac{(r_{k+1}-r_k)(r_k-r_{k-1})}{|r_{k+1}-r_k||r_k-r_{k-1}|}\right)$$

With the processing above, the first obtaining unit 11 is capable of obtaining the light path Rj and the light transmittance ERj of the light path Rj. Here, j represents the number of samplings in the Monte Carlo ray tracing simulation. The greater number of samplings allows modeling with higher precision.

It is desirable that parameters (scattering coefficient, absorption coefficient, and parameter g of the phase function) used in the Monte Carlo ray tracing simulation have values close to the actual values of a scatterer whose inside is to be estimated. Generally, it is difficult to estimate these parameters from a real object.

Hence, in Embodiment 1, the intensity distribution of light exiting a scatterer including no light absorbing object is observed beforehand. Subsequently, the first obtaining unit 11 searches for parameters so that the light intensity distribution indicated by light transmittance derived from the light path models obtained as a result of the Monte Carlo ray tracing simulation is close to the actual light intensity distribution.

For example, NPL 1 discloses an example where various coefficients are estimated in the case of a single scattering event in which scattering occurs only once. NPL 4 discloses an example of various coefficients relative to a living body, such as human skin. Referring to the various coefficients described in the above literatures, the first obtaining unit 11 sets initial values of parameters (scattering coefficient, absorption coefficient, and parameter g of phase function) of an object having a medium close to that of the scatterer whose inside is actually to be estimated. Subsequently, the first obtaining unit 11 obtains parameters by infinitesimally adjusting the parameters so that the error between the light intensity distribution obtained by the light transmittance indicated by the simulation result and the light intensity distribution indicated by the observation result is minimum. More specifically, the first obtaining unit 11 derives parameters used in the Monte Carlo ray tracing simulation, by reducing the error between the simulation result and the observation result through coarse-to-fine search. Accordingly, the first obtaining unit 11 is capable of increasing the accuracy of parameters.

(Step S102)

Next, a description is given of capturing processing (S102) performed by the second obtaining unit 12. In the capturing processing, the second obtaining unit 12 captures images of the actual scatterer. First, a description is given of a method of capturing images of the scatterer from one direction, and then, a description is given of a method of capturing images of the scatterer from multiple directions to obtain reliable two-dimensional tomographic images.

Figure 5:
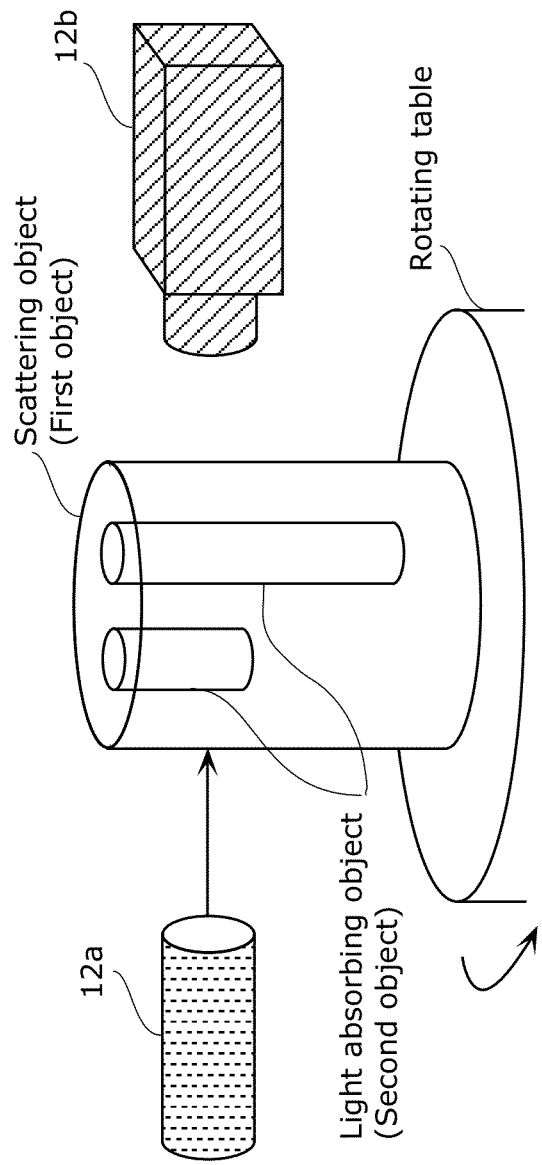
FIG. 5 is a schematic diagram showing an example of arrangement of a light source unit, a scatterer, and a capturing unit.

FIG. 5 is a schematic diagram showing an example of arrangement of the light source unit 12a, the scatterer, and the capturing unit 12b. Here, a description is given of an example where a laser is used as the light source. The type of laser may be a visible-light laser or a near-infrared light laser.

For example, the visible-light laser may be used for estimating the inside of a scatterer having a medium, such as diluted milk, which allows a certain degree of transmission of visible light. Furthermore, for example, it is desirable to use the near-infrared light laser or a light-emitting diode (LED) light source for estimating the inside of a scatterer having a medium, such as food or a living body, which does not allow transmission of visible light, but allows transmission of near-infrared light.

The visible light and the near-infrared light have different wavelengths; and thus, parameters of the scattering coefficient, the absorption coefficient, and the phase function are also different. Hence, the parameters used in the Monte Carlo ray tracing simulation need to be adjusted according to the light source and the medium of the scatterer. There is no difference in processing performed for estimating the light absorbing object between cases where visible light is used and cases where near-infrared light is used. Hereinafter, the light entering a scatterer is referred to as "incident light", and the light exiting the scatterer is referred to as "outgoing light".

Figure 6:
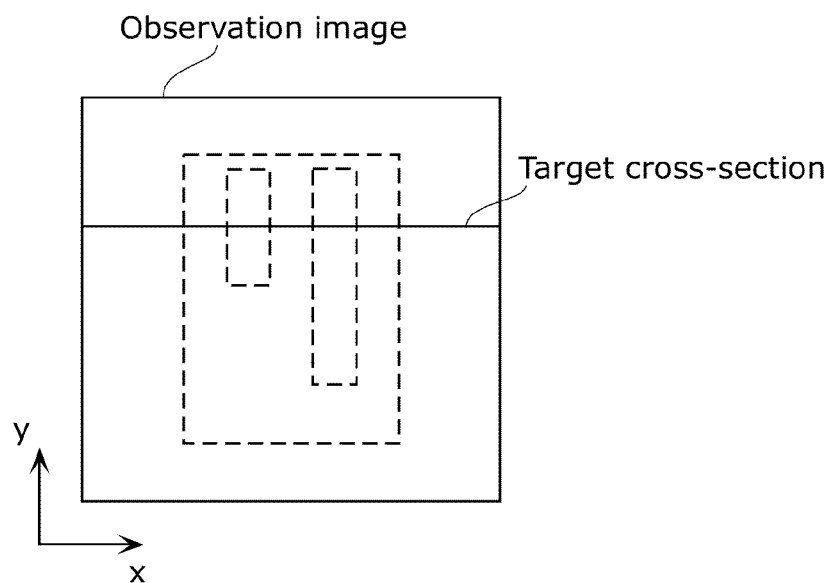
FIG. 6 is a diagram showing an example of an observation image according to Embodiment 1.
Figure 7:
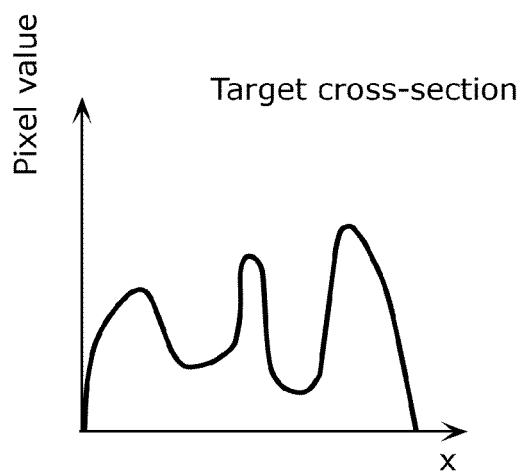
FIG. 7 is a diagram showing an example of values of a pixel column corresponding to a cross-section of an estimation target according to Embodiment 1.

In FIG. 5, the light source unit 12a emits light to the scatterer. Furthermore, the capturing unit 12b observes outgoing light. For example, in the case where the positions of light absorbing objects on a horizontal cross-section of the scatterer are estimated, as shown in FIG. 6 and FIG. 7, a pixel column in the horizontal direction (x-direction) corresponding to the target cross-section are obtained from an observation image. FIG. 7 is a graph where the horizontal axis represents the position of each pixel in the obtained pixel column (x-coordinate), and the vertical axis represents the pixel values.

With the above processing, it is possible to observe light incident on the scatterer from one direction. However, information of light from only one direction provides insufficient depth-direction information, which results in low accuracy in estimating the positions of the light absorbing objects. In view of this, it may be that images are captured while rotating the scatterer placed at the center of a rotating table. In other words, the capturing unit 12b may capture images of light exiting the scatterer after entering the scatterer from a plurality of directions.

Specifically, Steps S101 to S104 may be performed for each of light beams entering the scatterer from different directions. More specifically, the first obtaining unit 11 may obtain, for each of the light beams, a plurality of light path models and the first light intensity distribution. The second obtaining unit 12 may obtain the second light intensity distribution for each of the light beams. The voting value calculating unit 13 may calculate a voting value for each of the light beams. The voting unit 14 may vote the voting value for each of the light beams.

Accordingly, it is possible to increase the estimate accuracy in the depth direction. In Embodiment 1, a description has been given of a method in which the scatterer is rotated by using a rotating table; however, it may be that the light source unit 12a and the capturing unit 12b revolve around the scatterer.

(Step S103)

Next, a description is given of calculation of a voting value (S103) performed by the voting value calculating unit 13. The calculation of a voting value (S103) and voting processing (S104) do not depend on the rotation angle of the scatterer; and thus, a description is given of an example where light enters the scatterer from one direction.

Figure 8:
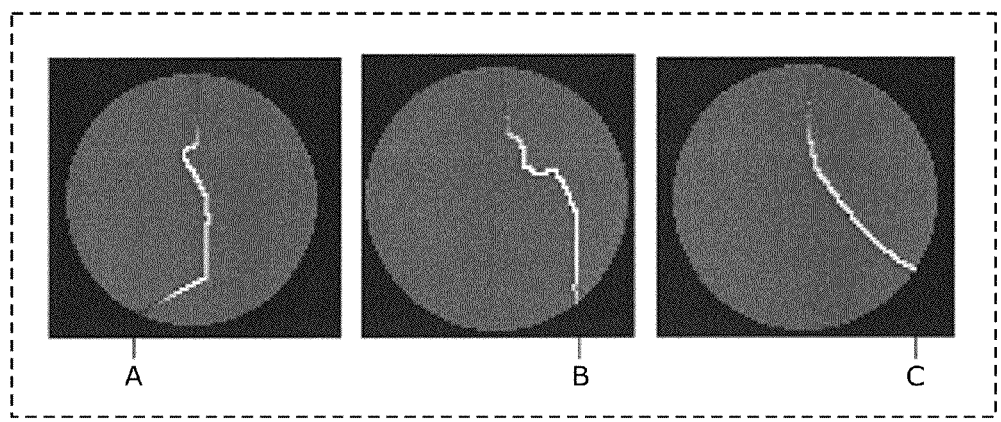
FIG. 8 is a diagram showing examples of light path models according to Embodiment 1.

FIG. 8 shows an example of three path models of light reaching the pixel A, the pixel B, and the pixel C derived by the Monte Carlo ray tracing simulation. In the following description, the left light path model is referred to as a "light path model corresponding to the pixel A", the middle light path model is referred to as a "light path model corresponding to the pixel B", and the right light path model is referred to as a "light path model corresponding to the pixel C".

A plurality of light path models as shown in FIG. 8 are derived for light entering the scatterer from one direction. In other words, one incident light beam exits the scatterer from a plurality of positions after propagating through a plurality of paths.

Figure 9:
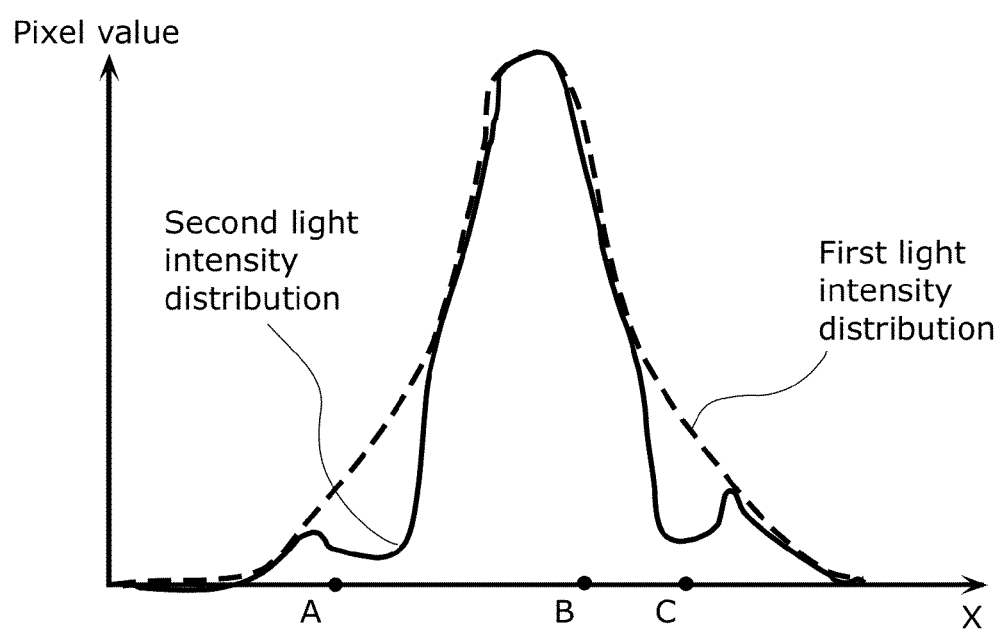
FIG. 9 is a diagram showing an example of a distribution of light transmittance (first light intensity distribution) and a distribution of observation values (second light intensity distribution), according to Embodiment 1.

FIG. 9 shows an example of light transmittance distribution (the first light intensity distribution) obtained by scattering models and observation value distribution (the second light intensity distribution). In FIG. 9, the horizontal axis represents the positions on the target cross-section. The positions corresponding to the pixel A, the pixel B, and the pixel C are respectively indicated as A, B, and C. Furthermore, in FIG. 9, the vertical axis represents the pixel values (light transmittance and observation values).

Since the light transmittance and the observation values are different in scale, the light transmittance distribution and the observation value distribution are normalized so that the maximum value of the light transmittance and the maximum value of the observation values is equal to each other. FIG. 9 shows an example of the distributions obtained when two cylindrical light absorbing objects are placed in a cylindrical scatterer shown in FIG. 6.

After summing the light transmittance of the respective light path models obtained by Equation (17), the normalized light transmittance is obtained. Here, it is assumed that the value of the normalized light transmittance of a pixel i is NERi and the value of the pixel i observed by the capturing unit 12b is Ti.

The probability V(Rj) of non-existence of the light absorbing object on N light path models Rj (j ranges from 1 to N) obtained by the Monte Carlo ray tracing simulation is defined by Equation (19).

[Equation 19]

$$V(Rj) = \begin{cases} 0: & \text{with light sheilding object} \\ 1: & \text{no light sheilding object} \end{cases} \quad (19)$$

Here, the probability of non-existence of the light absorbing object on the path of the light beam reaching the position of the pixel is defined by V(Rij). The relation among the normalized light transmittance NERi of the light beam reaching the position of the pixel i, the observation pixel value Ti, and the probability V(Rij) of non-existence of the light absorbing object is represented by Equation (20).

[Equation 20]

$$V(Rij)NERi = Ti \quad (20)$$

The probability V(Rij) of non-existence of the light absorbing object is represented using the pixel value Ti of the pixel i as shown by Equation (21).

[Equation 21]

$$V(R_{ij}) = \frac{Ti}{NERi} \quad (21)$$

The probability of non-existence of the light absorbing object is obtained by finding the proportion of the observed pixel value to the normalized light transmittance obtained by a scattering model. Accordingly, the probability of non-existence of the light absorbing object on a path of light reaching each pixel is obtained. In the calculation of a voting value, the non-existence probability thus obtained is output as a voting value for each pixel.

(Step S104)

A description is given of voting processing (S104) performed by the voting unit 14. In the voting processing, the voting unit 14 obtains a distribution of the non-existence probability of the light absorbing object in the scatterer, by voting the obtained non-existence probabilities to voting regions on the light path models obtained by the Monte Carlo ray tracing simulation.

Figure 10:
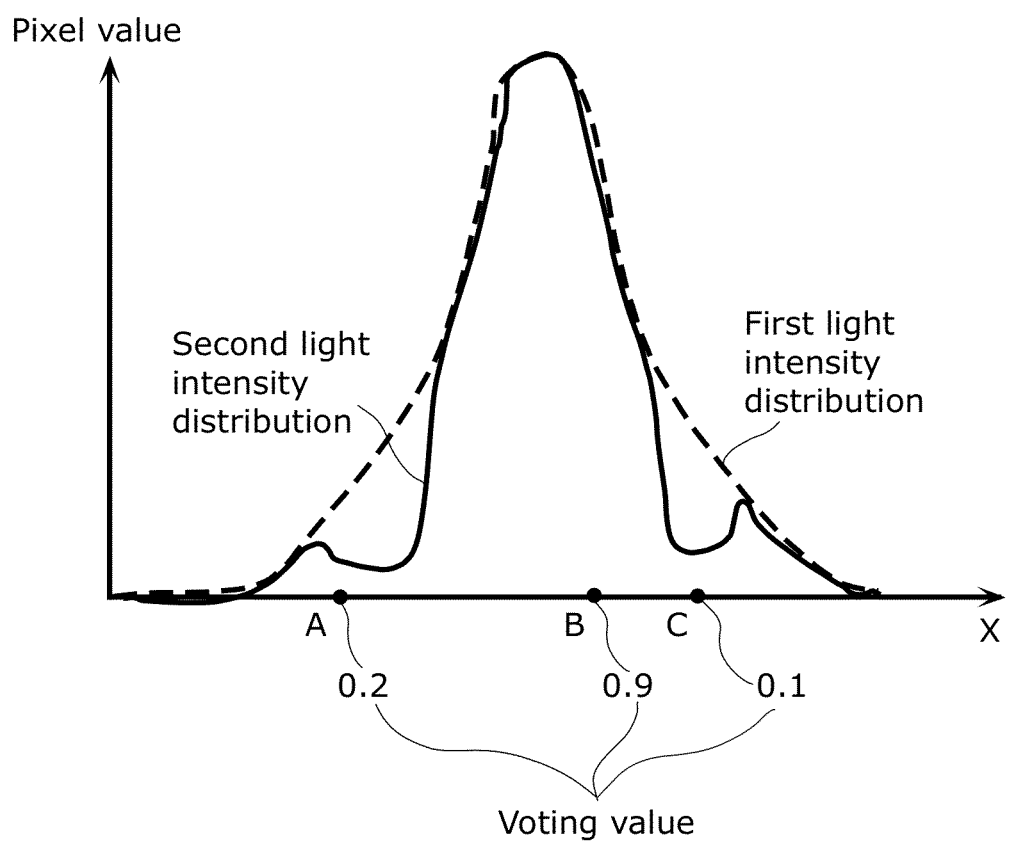
FIG. 10 is a diagram for explaining voting processing according to Embodiment 1.
Figure 11:
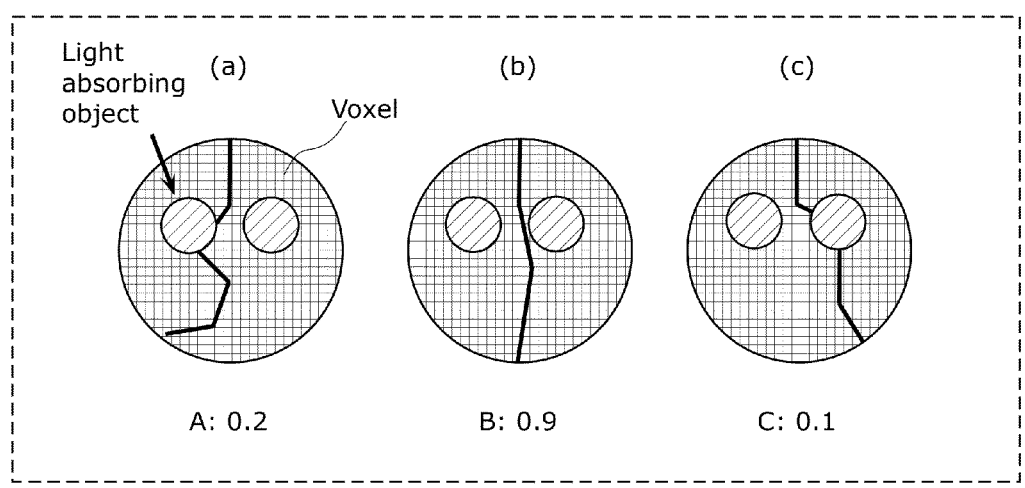
FIG. 11 is another diagram for explaining the voting processing according to Embodiment 1.

Referring to FIG. 10 and FIG. 11, a description is given of the voting processing.

As shown in FIG. 10, in the voting value calculation, the non-existence probabilities (voting values) of the light absorbing object at the pixel A, the pixel B, and the pixel C are calculated as 0.2, 0.9, and 0.1, respectively. Here, as shown in FIG. 11, the voting value calculated for each pixel is added to the value of each voting region on the corresponding light path models of light reaching the pixel A, the pixel B, and the pixel C. Here, the voting regions are voxels obtained by virtually dividing the scatterer. As shown in (a) of FIG. 11, the voting value of 0.2 is voted to each voxel on the light path model of light reaching the pixel A.

The voting values voted to each voting region on the light path models of light reaching the pixel A and the pixel C are respectively 0.2 and 0.1, which are relatively small values ((a) and (c) of FIG. 11). In contrast, the voting value voted to each voting region on the light path model of light reaching the pixel B is a relatively large value ((b) of FIG. 11).

Each observation value corresponds to the sum of a plurality of outgoing light beams; and thus, the value rarely becomes 0 even when the light absorbing object exists. However, voting a small voting value a plurality of times clarifies the difference in the non-existence probability of the light absorbing object among the voting regions.

(Step S106)

A description is given of estimation (S106) performed by the estimating unit 15. In the estimation, one or more light absorbing objects within a scatterer are estimated. More specifically, the estimating unit 15 determines, for each voting region, that a light absorbing object exists in the voting region if the voting result is smaller than a threshold.

With the processing above, a result of estimation of the light absorbing object on a given cross-section is obtained. Subsequently, the estimating unit 15 generates two-dimensional tomographic images, by estimating the light absorbing object for each of cross-sections at different positions (for example, height). The combining unit 16 generates three-dimensional volume data (three-dimensional images) by combining the generated two-dimensional tomographic images.

In the example of FIG. 6, estimation is performed on each cross-section by changing the y-coordinate of the pixel column. The combining unit 16 is capable of not only simply arranging the two-dimensional tomographic images, but also applying signal processing to the two-dimensional tomographic images as necessary. Examples of the signal processing include processing for increasing continuity between the tomographic images and smoothing processing for removal of noise. For such signal processing, existing processing for increasing image quality used in volume rendering may be used.

<Effects>

As described above, the estimation apparatus 10 according to Embodiment 1 is capable of estimating whether or not a light absorbing object exist in each region in a scatterer, by using a plurality of light path models representing a plurality of paths taken by light after entering the scatterer and before exiting the scatterer. Hence, even when light is scattered in the scatterer, it is possible to estimate the position and the shape of the light absorbing object in the scatterer. More specifically, it is possible to increase the accuracy in estimating the inside of an object with use of light which is other than X-rays, such as near-infrared light, and which is safe to the human body.

Furthermore, the estimation apparatus 10 according to Embodiment 1 is capable of calculating voting values each indicating the probability of existence of the light absorbing object in the scatterer, based on results of comparison in light intensity between the first light intensity distribution and the second light intensity distribution. Furthermore, it is possible to estimate whether or not a light absorbing object exists in each voting region, based on the voting results of the voting values relative to the voting regions on the light path models. More specifically, it is not necessary to use light of a plurality of wavelengths nor to perform linear operations, to estimate the inside of the scatterer. Accordingly, the approximation for the linear operation of the absorptance distribution is also unnecessary, which allows an increase in the estimate accuracy of the inside of the object.

Furthermore, the estimation apparatus 10 according to Embodiment 1 is capable of generating three-dimensional volume data, by combining two-dimensional tomographic images. Accordingly, it is possible to estimate the inside of the scatterer more accurately.

Embodiment 2

Next, a description is given of an apparatus which estimates the inside of an object (hereinafter, referred to as the estimation apparatus), according to Embodiment 2. In the similar manner to Embodiment 1, the estimation apparatus according to Embodiment 2 estimates the inside of an object. However, Embodiment 2 is different from Embodiment 1 in that voting results are corrected.

Referring to the drawings, the estimation apparatus according to Embodiment 2 are specifically described below. In Embodiment 2, the functions or processing similar to those in Embodiment 1 may not be described to avoid redundancy.

<Functional Configuration>

Figure 12:
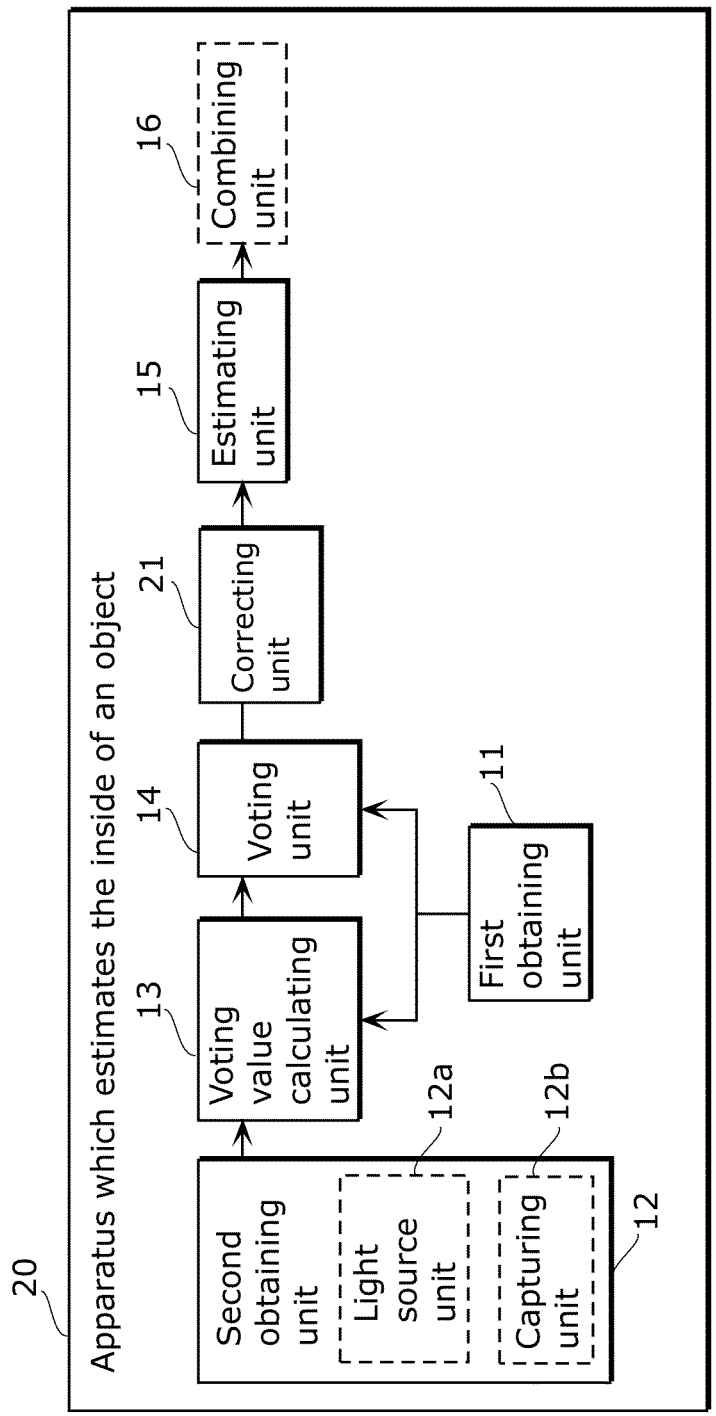
FIG. 12 is a block diagram showing a functional configuration of an apparatus which estimates the inside of an object, according to Embodiment 2.

FIG. 12 is a block diagram showing a functional configuration of an apparatus 20 which estimates the inside of an object (hereinafter, referred to as the estimation apparatus 20), according to Embodiment 2.

A correcting unit 21 corrects a bias in voting values which occurs according to the number of light paths in voting regions in a scatterer or the incident position of light. More specifically, for example, the correcting unit 21 may correct voting results, based on the variation in the number of times voting was performed on the voting regions. Furthermore, for example, the correcting unit 21 may correct the voting results, based on the positions of the respective voting regions.

The estimating unit 15 estimates whether or not a light absorbing object exists in each of the voting regions, based on the corrected voting result.

<Operations>

Figure 13:
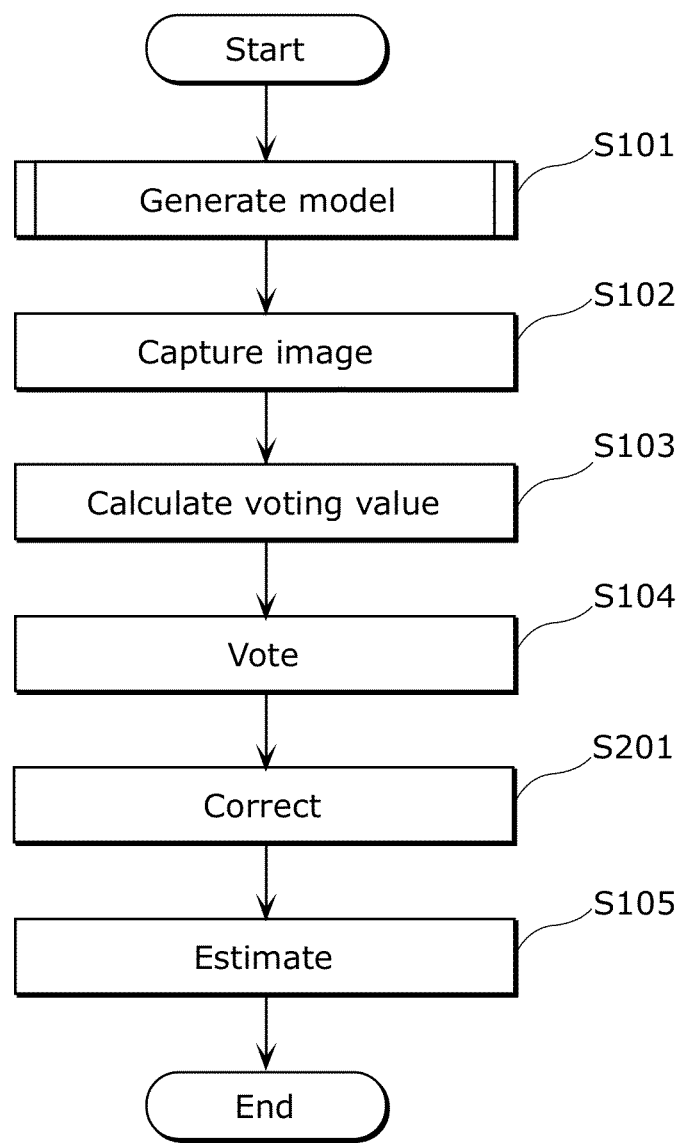
FIG. 13 is a flowchart of operations performed by the apparatus which estimates the inside of the object according to Embodiment 2.

Next, a description is given of operations of the estimation apparatus 20 having the configuration as above. FIG. 13 is a flowchart of operations of the estimation apparatus 20 according to Embodiment 2. In FIG. 13, correction processing (S201) is added to the flowchart in FIG. 2.

In the voting processing, a bias occurs in the voting results according to the variation in the number of times voting was performed or the setting of incident position of light. Hence, in the correction (S201), the bias in the voting results is reduced by performing the following processing.

With respect to the variation in the number of times voting was performed, the number of times voting was performed on respective voting regions is recorded, and the voting results are normalized using the recorded number of times voting was performed. For example, the correcting unit 21 obtains the normalized voting result for each voting region, by dividing the sum of the voting values voted to the region by the number of times voting was performed. Here, a voting region with the number of times voting was performed being 0 is defined as an indefinite region, and is excluded from the calculation of the voting results.

Figure 14:
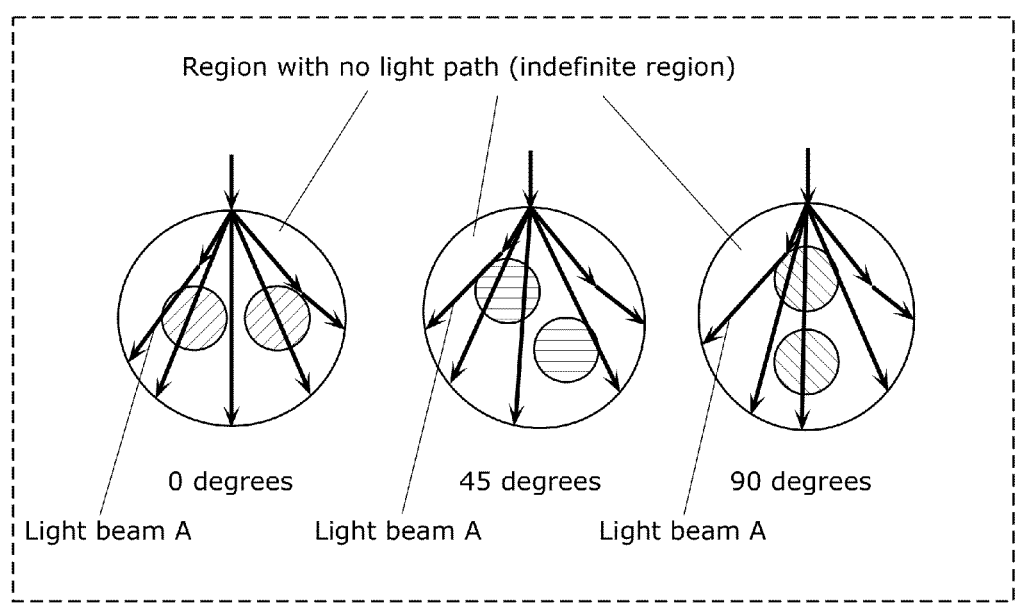
FIG. 14 is a schematic diagram showing light path models according to Embodiment 2.

For example, FIG. 14 is a schematic diagram showing light path models obtained when incident light is scattered within the scatterer. FIG. 14 shows examples of the light path models in the case of the incident angle of light being 0 degrees, 45 degrees, and 90 degrees. The scatterer having a circular cross-section includes two light absorbing objects. In the case where light having high directness, such as a laser, is incident on the scatterer, a plurality of light path models spread out in a fan-like form, as indicated by solid-line arrows in FIG. 14. Here, the regions to the left and right of the incident position have no light path; and thus, the regions are referred to as indefinite regions.

The second obtaining unit 12 captures images by rotating the scatterer as shown in FIG. 14. Subsequently, the voting unit 14 performs the voting processing independently on a plurality of incident angles. The correcting unit 21 then calculates an average value of the voting results obtained with respect to the incident angles, excluding the voting results of the voting regions which are determined as the indefinite regions. More specifically, voting regions can obtain voting results as long as the voting regions are not determined as indefinite regions with respect to any one of the incident angles. In such a manner, the correcting unit 21 calculates the voting results so that the indefinite regions do not affect the voting results.

Next, a description is given of correction of a bias in the voting results performed according to the setting of the incident position of light. In the first place, when light is emitted to a scatterer and images are captured, and if the incident direction of light and the normal direction of the surface of the scatterer at the incident position are not opposed to each other, the incident light is refracted at the surface of the scatterer. When the incident light is refracted at the surface of the scatterer, difficulty in generation of scattering models increases, because scattering models need to be generated in consideration with the shape of the object, Fresnel coefficient, and others.

In view of the above, for example, in the case of a scatterer having a circular cross-section, the light source unit 12a emits light to the scatterer from a position at which the incident direction of light and the normal direction of the surface of the scatterer at the incident position are opposed to each other. This avoids problem of refraction at the surface of the scatterer. However, limiting the incident position of light in such a manner may result in incorrect voting results in the voting regions with sufficient number of times voting was performed.

For example, a light absorbing object exists on the light path models of the light beam A shown in FIG. 14. Hence, a voting value indicating a high existence probability of the light absorbing object is voted to each voting region on the light path models of the light beam A. However, no light absorbing object exists at the downstream side (near the position from which the light beam A exits the scatterer) of the light path model of the light beam A. Here, in the case where the incident position of light is limited, there are cases where no light path model exists which passes through, without crossing the light absorbing object, voting regions near the position from which the light beam A exits. In such a case, the voting unit 14 is not capable of voting a voting value indicating that no light absorbing object exists, to voting regions where the light absorbing object does not actually exist.

Hence, the correcting unit 21 corrects the voting results, based on the positions of the respective voting regions. More specifically, the correcting unit 21 corrects the voting results, based on the degree of reliability described below, which depends on the position within the scatterer. For example, in the case where light is incident on a scatterer having a circular cross-section, from the position which is opposed to the normal of the surface at the incident position, the reliability of the voting values at the center portion of the cross-section of the scatterer is higher. The reliability of the voting values at the positions closer to the periphery (surface) of the scatterer is lower.

In view of the above, the correcting unit 21 corrects the voting results to allow the existence probability of the light absorbing object in a first voting region to be relatively lower than the existence probability of the light absorbing object in a second voting region. Here, the second voting region is closer to the center of the scatterer than the first voting region is. In other words, the first voting region is closer to the surface of the scatterer than the second voting region is. More specifically, in the case where the voting value indicates the non-existence probability, for example, the correcting unit 21 increases the voting result of the first voting region by a first value, and increases the voting result of the second voting region by a second value smaller than the first value.

Figure 15:
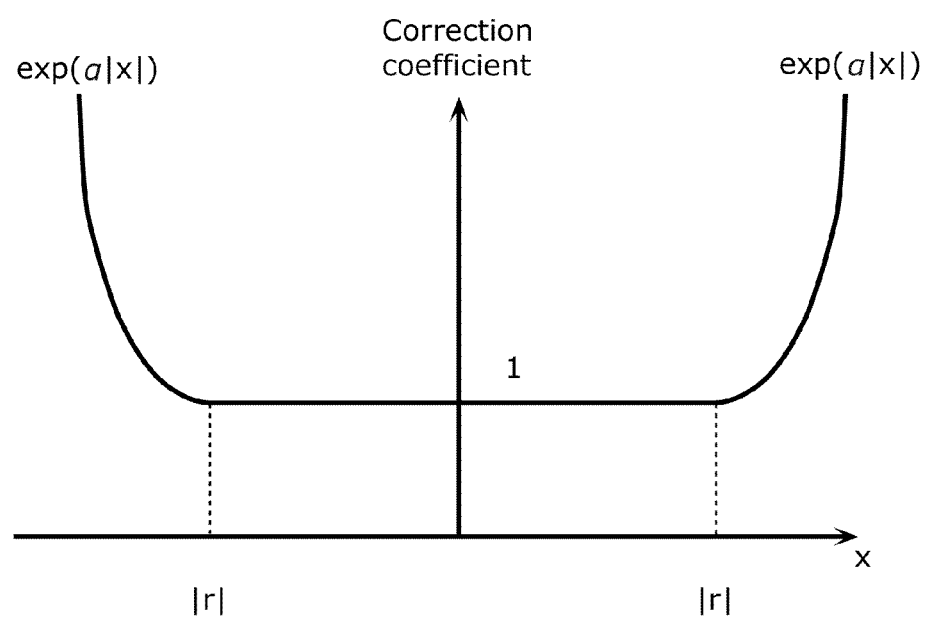
FIG. 15 is a diagram for explaining correction processing according to Embodiment 2.

In Embodiment 2, the correcting unit 21 corrects the voting results using the correction coefficient as shown in FIG. 15. The correction coefficient has a value of 1 at the positions distant from the center of the scatterer by distance r or less, and has a value of $\exp(\alpha|x|)$ at the positions farther than the distance r. The correcting unit 21 corrects the voting result of the voting value indicating the non-existence probability, by multiplying the value of the voting result by the correction coefficient. Accordingly, the correcting unit 21 is capable of obtaining appropriate voting results even when the reliability of the voting values at the periphery portions of the scatterer is decreased due to the spread of the light path models into a fan-like form. With respect to a scatterer having a cross-section other than in circular shape, the correcting unit 21 is capable of appropriately correcting the voting results, by using the correction coefficient according to the reliability based on the light path model distribution.

Based on the voting results thus corrected, the estimating unit 15 estimates the light absorbing object in each voting region in the estimation processing (S105). More specifically, the estimating unit 15 determines, for each voting region, that a light absorbing object exists in the voting region if the voting value is smaller than a threshold.

<Effects>

As described above, the estimation apparatus 20 according to Embodiment 2 is capable of estimating the inside of a scatterer with high-accuracy, even when the incident position of light is limited or when the scatterer includes regions, near the surface of the scatterer, where light does not reach depending on the scattering degree.

More specifically, the estimation apparatus 20 according to Embodiment 2 is capable of correcting the voting results, based on the variation in the number of times voting was performed among the voting regions. Accordingly, for example, it is possible to decrease erroneous estimation that the light absorbing object exists in regions, in the scatterer, where light is less likely to pass (regions with small number of times voting was performed).

Furthermore, the estimation apparatus 20 according to Embodiment 2 is capable of correcting the voting results, based on the positions of the respective voting regions. Accordingly, it is possible to suppress a decrease in the estimate accuracy in the case where the accuracy in estimation of whether or not a light absorbing object exists varies depending on the position of the voting region.

In particular, according to the estimation apparatus 20 in Embodiment 2, it is possible to correct the voting results to allow the existence probability of the light absorbing object in the first voting region to be relatively lower than that the existence probability of the light absorbing object in the second voting region. Here, the second voting region is closer to the center of the scatterer than the first voting region is. Hence, it is possible to decrease erroneous estimation that a light absorbing object exists in voting regions with no light absorbing object, among all the voting regions on path models of light transmitting through the light absorbing object.

Other Embodiments

The herein disclosed subject matter is to be considered descriptive and illustrative only, and the appended Claims are of a scope intended to cover and encompass not only the particular embodiments disclosed, but also equivalent structures, methods, and/or uses.

For example, in each of the above embodiments, the first obtaining unit 11 obtains, for each estimation, a plurality of light path models and light transmittance; however, the first obtaining unit 11 needs not obtain them for each estimation. When a scatterer to be estimated is known beforehand, it may be that a plurality of light path models and light transmittance are read from a storage unit (memory) storing a plurality of light path models and light transmittance derived for the scatterer before. Accordingly, it is possible to reduce the processing load of the first obtaining unit 11.

Furthermore, for example, in each embodiment above, the first obtaining unit 11 derives a plurality of light path models and light transmittance; however, the first obtaining unit 11 needs not perform such derivation. For example, the first obtaining unit 11 may obtain, from an external apparatus, a plurality of light path models and light transmittance which have already been obtained for the scatterer to be estimated.

Furthermore, for example, in each embodiment above, the light path models are obtained by the Monte Carlo ray tracing; however, the light path models may be obtained by other scattering modeling schemes.

Furthermore, for example, in each embodiment above, a description has been given of the case where the first light intensity distribution is light transmittance; however, the first light intensity distribution may not be the light transmittance. More specifically, the first light intensity distribution may be any data as long as the data indicates the intensity of virtual light, on a predetermined plane, exiting the scatterer after propagating through the scatterer along a plurality of light path models.

Furthermore, for example, in each embodiment above, the second obtaining unit 12 includes the light source unit 12a and the capturing unit 12b; however, the second obtaining unit 12 may not include the light source unit 12a and the capturing unit 12b. For example, it may be that a light source provided outside the estimation apparatus may emit light to a scatterer. Furthermore, for example, the second obtaining unit 12 may obtain, via a network, a recording medium or the like, observation images captured by a camera provided outside the estimation apparatus.

Furthermore, for example, in each embodiment above, the observation images are images of light that has transmitted through the scatterer; however, the observation images may be images of light reflected within the scatterer.

Furthermore, for example, in each embodiment above, a description has been given of the case where the second light intensity distribution is an image; however, the second light intensity distribution may not be an image. More specifically, the second light intensity distribution may be any data as long as the data indicates the intensity distribution of light, observed on a predetermined plane, exiting the scatterer.

Furthermore, for example, in each embodiment above, a sum of voting values voted for respective voting regions are used as voting results; however, for example, a statistical representative value (such as an average value, a maximum value, or a minimum value) of voting values may be used as voting results. Use of appropriate representative values restricts decrease in the estimate accuracy caused due to the variation in the number of times voting was performed.

Furthermore, for example, in each embodiment above, light absorbing objects are estimated for each cross-section of a scatterer; however, the estimation needs not be performed for each cross-section. For example, the estimation may be performed in three dimensions. In this case, three-dimensional images of the inside of the scatterer can be obtained without combining two-dimensional tomographic images. More specifically, the estimation apparatus may not include the combining unit.

Furthermore, part or all of the structural elements of the estimation apparatus according to each embodiment above may be configured from a single system large scale integration (LSI). For example, the estimation apparatus may be configured from a system LSI including the first obtaining unit 11, the second obtaining unit 12; the voting value calculating unit 13; the voting unit 14; and the estimating unit 15.

The system LSI is a super-multi-function LSI manufactured by integrating structural elements on one chip, and is specifically a computer system configured by including a microprocessor, a read only memory (ROM), a random access memory (RAM), and so on. The ROM stores a computer program. The system LSI achieves the functions through the microprocessor's operation according to the computer program.

The name used here is the system LSI, but it may also be referred to as IC, LSI, super LSI, or ultra LSI depending on the degree of integration. Moreover, ways to achieve integration are not limited to the LSI, and a dedicated circuit or general purpose processor can also achieve the integration. Field Programmable Gate Array (FPGA) that can be programmed after manufacturing LSI or a reconfigurable processor that allows re-configuration of the connection or setting of circuit cells in the LSI can be used for the same purpose.

Furthermore, when a circuit integration technology for replacing LSIs appears in the future with advancement in semiconductor technology and derivative other technologies, the circuit integration technology may be naturally used to integrate the functional blocks. Application of biotechnology is one such possibility.

These general and specific aspects may be implemented not only as the estimation apparatus, but also as a method of estimating the inside of an object, including, as steps, the characteristics structural elements in the estimation apparatus. Furthermore, these general and specific aspects may be implemented as a computer program causing a computer to execute the steps included in the estimation method. It is needless to say that such a computer program may be distributed via a computer-readable non-transitory recording medium or a communication network, such as the Internet.

Furthermore, in an embodiment, it may be that part of processing described in each embodiment above is performed by a server (cloud) and the rest of processing is performed by the estimation apparatus. For example, it may be that the estimation apparatus includes only the first obtaining unit 11, the second obtaining unit 12, and the estimating unit 15, and the server includes the voting value calculating unit 13, the voting unit 14, and the combining unit 16. Other than the above, efficient processing can be achieved by the estimation apparatus including only structural elements with small processing amount.

Each of the structural elements in each of the above-described embodiments may be configured in the form of an exclusive hardware product, or may be realized by executing a software program suitable for the structural element. Each of the structural elements may be realized by means of a program executing unit, such as a CPU or a processor, reading and executing the software program recorded on a recording medium such as a hard disk or a semiconductor memory. Here, the software program for realizing the estimation apparatus according to each of the embodiments is a program described below.

The program causes a computer to execute a method of estimating an inside of a first object. The method includes: obtaining a plurality of light path models and a first light intensity distribution, based on an assumption that the first object includes no second object which is different from the first object, the light path models representing a plurality of paths taken by light after entering the first object and before exiting the first object, the first light intensity distribution indicating an intensity of virtual light on a predetermined plane, the virtual light exiting the first object after propagating through the first object along the light path models; obtaining a second light intensity distribution which is an intensity distribution of light exiting the first object after entering the first object, the intensity distribution of the light being observed on the predetermined plane; calculating a voting value for each of positions on the predetermined plane, based on a result of comparison in light intensity between the first light intensity distribution and the second light intensity distribution, the voting value indicating a probability of existence of the second object in the first object; virtually dividing the inside of the first object into a plurality of voting regions, and voting the voting value calculated for the each of the positions on the predetermined plane to voting regions on a light path model along which light reaches the position, the voting being performed for the each of the positions; and estimating whether or not the second object exists in each of the voting regions, based on a result of the voting.

An apparatus and a method of estimating the inside of an object, according to one or more exemplary embodiments disclosed herein are applicable to accurate estimation of a second object included in a first object, and to a capturing apparatus such as a measurement device, a monitoring camera, or a digital camera.

The invention claimed is:

1. An apparatus which estimates an inside of a first object, the apparatus comprising:
   a non-transitory memory storing a program;
   a hardware processor that executes the program and causes the apparatus to obtain a plurality of light path models and a first light intensity distribution, based on an assumption that the first object includes no second object which is different from the first object, the light path models representing a plurality of paths taken by light after entering the first object and before exiting the first object, the first light intensity distribution indicating an intensity of virtual light on a predetermined plane, the virtual light exiting the first object after propagating through the first object along the light path models, the first light intensity distribution being indicated by light transmittance derived from the light path models obtained as a result of ray tracing simulation; and a camera configured to obtain a second light intensity distribution which is an intensity distribution of light exiting the first object after entering the first object, a light source emitting visible light or near-infrared light to the object and the camera obtaining an observation image indicating the second light intensity distribution;

wherein the hardware processor executes the program and causes the apparatus to calculate a voting value for each of positions on the predetermined plane, based on a result of comparison in light intensity between the first light intensity distribution and the second light intensity distribution, the voting value indicating a probability of existence of the second object in the first object;

virtually divide the inside of the first object into a plurality of voting regions, and add the voting value calculated for the each of the positions on the predetermined plane to values of voting regions on a light path model along which light reaches the position, the adding being performed for the each of the positions; and estimate whether or not the second object exists in each of the voting regions, by comparing a result of the adding of the voting value for each of the voting regions with a threshold.

2. The apparatus according to claim 1, wherein the hardware processor executes the program and causes the apparatus to:

correct the voting result, based on a variation in a total number of times the voting was performed among the voting regions, and estimate whether or not the second object exists in each of the voting regions, based on the corrected voting result.

3. The apparatus according to claim 1, wherein the voting regions are a plurality of regions on a cross-section of the first object, the estimating generates a plurality of two-dimensional tomographic images by estimating, for each of a plurality of the cross-sections, whether or not the second object exists in each of the voting regions, and the hardware processor executes the program and causes the apparatus to generate three-dimensional volume data of the inside of the first object, by combining the two-dimensional tomographic images.

4. The apparatus according to claim 1, wherein the camera includes:

a light source unit configured to emit visible light or near-infrared light to the first object; and a capturing unit configured to obtain an observation image indicating the second light intensity distribution, by capturing an image of light exiting the first object after entering the first object.

5. The apparatus according to claim 1, wherein the hardware processor executes the program and causes the apparatus to derive the light path models by Monte Carlo ray tracing simulation.

6. The apparatus according to claim 5, wherein the hardware processor executes the program and causes the apparatus to derive a parameter to be used in the Monte Carlo ray tracing simulation, by reducing an error between a simulation result and an observation result through a coarse-to-fine search.

7. The apparatus according to claim 1, wherein the hardware processor executes the program and causes the apparatus to obtain the light path models and the first light intensity distribution for each of a plurality of light beams which enters the first object from different directions, the camera obtains the second light intensity distribution for each of the light beams, the hardware processor executes the program and causes the apparatus to calculate the voting value for each of the light beams, and vote the voting value for each of the light beams.

8. The apparatus according to claim 1, wherein the hardware processor executes the program and causes the apparatus to correct the voting result, based on the position of each of the voting regions, and estimate, based on the corrected voting result, whether or not the second object exists in each of the voting regions.

9. The apparatus according to claim 8, wherein the voting regions include a first voting region and a second voting region that is closer to a center of the first object than the first voting region is, and the hardware processor executes the program and causes the apparatus to correct the voting result to allow the probability of existence of the second object in the first voting region to be relatively lower than the probability of existence of the second object in the second voting region.

10. A method for an apparatus of estimating an inside of a first object, the apparatus including a camera, a non-transitory memory storing a program and a hardware processor that executes the program and causes the apparatus to perform the method comprising:

obtaining, using the hardware processor, a plurality of light path models and a first light intensity distribution, based on an assumption that the first object includes no second object which is different from the first object, the light path models representing a plurality of paths taken by light after entering the first object and before exiting the first object, the first light intensity distribution indicating an intensity of virtual light on a predetermined plane, the virtual light exiting the first object after propagating through the first object along the light path models, the first light intensity distribution being indicated by light transmittance derived from the light path models obtained as a result of ray tracing simulation;

obtaining, using the camera, a second light intensity distribution which is an intensity distribution of light exiting the first object after entering the first object, a light source emitting visible light or near-infrared light to the object and the camera obtaining an observation image indicating the second light intensity distribution;

calculating, using the hardware processor, a voting value for each of positions on the predetermined plane, based on a result of comparison in light intensity between the first light intensity distribution and the second light intensity distribution, the voting value indicating a probability of existence of the second object in the first object;

virtually dividing, using the hardware processor, the inside of the first object into a plurality of voting regions, and adding the voting value calculated for the each of the positions on the predetermined plane to values of voting regions on a light path model along which light reaches the position, the adding being performed for the each of the positions; and estimating, using the hardware processor, whether or not the second object exists in each of the voting regions, by comparing a result of the adding of the voting value for each of the voting regions with a threshold.

* * * * *